United States Patent [19]

Walker

[11] Patent Number: 5,070,440
[45] Date of Patent: Dec. 3, 1991

[54] POWER CONVERSION SCHEME EMPLOYING PARALLELED UNITS

[75] Inventor: Loren H. Walker, Salem, Va.

[73] Assignee: General Electric Company, Salem, Va.

[21] Appl. No.: 567,226

[22] Filed: Aug. 14, 1990

[51] Int. Cl.[5] ............................................. H02M 7/521
[52] U.S. Cl. ........................................ 363/71; 363/96; 363/137
[58] Field of Search ........................ 363/65, 71, 95, 96, 363/98, 132, 137, 138

[56] References Cited

U.S. PATENT DOCUMENTS

| Re. 29,560 | 2/1978 | Frank et al. | 363/71 |
|---|---|---|---|
| 3,768,001 | 10/1973 | Thorberg | 363/96 |
| 3,932,799 | 1/1976 | Frank et al. | 363/71 |
| 4,032,831 | 6/1977 | Nabae et al. | 363/41 |
| 4,084,220 | 4/1978 | Akamatsu | 363/65 |
| 4,188,663 | 2/1980 | Okawa et al. | 363/96 |
| 4,268,900 | 5/1981 | Hirata | 363/71 |
| 4,276,589 | 6/1981 | Okawa et al. | 363/137 |
| 4,349,772 | 9/1982 | Weiss | 363/65 |
| 4,392,099 | 7/1983 | Kuniyoshi | 363/65 |
| 4,549,258 | 10/1985 | Honbu et al. | 363/71 |
| 4,567,420 | 1/1986 | Beck | 363/138 |
| 4,730,242 | 3/1988 | Divan | 363/132 |
| 4,757,435 | 7/1988 | Wood et al. | 363/54 |
| 4,849,870 | 7/1989 | Heinrich | 363/65 |
| 4,947,100 | 8/1990 | Dhyanchand et al. | 363/71 |
| 4,965,709 | 10/1990 | Ngo | 363/137 |

Primary Examiner—Steven L. Stephan
Assistant Examiner—Jeffrey Sterrett
Attorney, Agent, or Firm—Arnold E. Renner

[57] ABSTRACT

A power conversion scheme employing a group of parallel connected, individually controlled converter circuits each providing output currents employs a scheme of distributed notches in the output currents to facilitate connection between common DC current and AC voltage sources. By the parallel connection of a pair of groups, time phase displaced group to group, additional power capability and harmonic reduction is achieved.

32 Claims, 8 Drawing Sheets

POWER CONVERSION SCHEME EMPLOYING PARALLELED UNITS

BACKGROUND OF THE INVENTION

This invention was made with Government support under Prime Contract DNA001-88-C-0028 awarded by the Department of Defense. The Government has certain rights in this invention.

The present invention relates generally to power conversion schemes and more particularly to a power conversion scheme having a plurality of parallel connected converter circuits or units (full wave bridges or half-wave star converters) to facilitate the transfer of relatively large amounts of electrical power.

It is a practice in the power conversion discipline, when large electrical currents are involved, to parallel connect a plurality of current carrying units. In a polyphase system, one form of paralleling includes a plurality of substantially identical bridges comprised of semiconductor devices such as gate turn-off thyristors or power transistors. The parallel connection of such bridges requires some means of assuring that the bridges properly share the currents.

In co-pending U.S. patent application Ser. No. 567,021 titled "Power Conversion Scheme Employing Shorting Means To Control Current Magnitude" filed on even date herewith, which patent application is hereby specifically incorporated herein by reference, there is described a scheme for the transfer of electrical power bidirectionally between a direct current (DC) current source and a alternating current (AC) voltage source. There, as here, the terms DC current source and AC voltage source are used in their pure sense; that is, either can be a source or a sink of electrical power. One example cited therein included electric power peaking stations where an AC utility line is connected to a peaking sink, such as a superconducting magnetic energy storage system, so that in times of excess, energy may be stored in the sink to be later utilized when demand increases. Other examples were: a) that of a motor drive in which, for example, an AC motor with regeneration capabilities is connected with respect to a DC current source, such as a highly inductive rectification system, and b) a system between two AC sources utilizing an intermediate DC link, commonly referred to as an HVDC system.

The scheme described by that co-pending application employs a notching technique to control the transfer of electrical power between the two sources. Although the claims of that invention are primarily concerned with the use of a thyristor as a means to provide a notch in the converter current and thus control the transfer of power, the basic concept of notching to provide the capability of controlling current is employed in the power conversion scheme of the present invention.

SUMMARY OF THE INVENTION

It is, therefore, an object of the present invention to provide an improved power conversion scheme for transferring power between a DC current source and an AC voltage source using parallel connected power conversion circuits or units.

It is a further object to provide an improved power conversion scheme employing a notching technique to improve current sharing between parallel connected power conversion units.

It is a still further object to provide a power conversion scheme having a plurality of parallel connected units and to employ a notching technique to improve current sharing and to parallel connect two or more of such pluralities to effect harmonic reduction.

It is an additional object to provide a power conversion scheme having parallel connected groups of parallel connected power conversion units, the units of each of said groups being collectively controlled to effect current sharing by a notching technique and phase displaced group-to-group for harmonic reduction.

It is a still further object to provide a power conversion scheme having parallel connected units and to employ a notching technique to permit the connecting of those units to a common DC current source without the aid of intermediate transformers.

The foregoing and other objects are achieved, in accordance with the present invention, by providing a power conversion scheme employing a plurality (group) of polyphase units connected in parallel between a DC current source and a AC voltage source. The scheme selectively activates the units to provide polyphase currents at a fundamental frequency corresponding to that of the AC voltage source. The AC currents of each of the individual conversion units are interrupted by notching. The notches are generally uniformly distributed within that group and are of generally uniform duration, varied slightly for current balancing.

In a further embodiment, two such groups are connected in parallel between the two sources. The conversion units of each group are operated as indicated above with the understanding that the duration of the interruptions (notches) may (and normally will) vary between the groups. The groups are also activated at different time phase relationships with respect to the AC voltage source in order to reduce selected harmonics in the output currents of the scheme as a whole.

BRIEF DESCRIPTION OF THE DRAWINGS

While the present invention is defined in particularity in the claims annexed to and forming a part of this specification, a better understanding thereof can be had by reference to the following specification taken in conjunction with the accompanying drawing in which:

DETAILED DESCRIPTION

Figure 1:
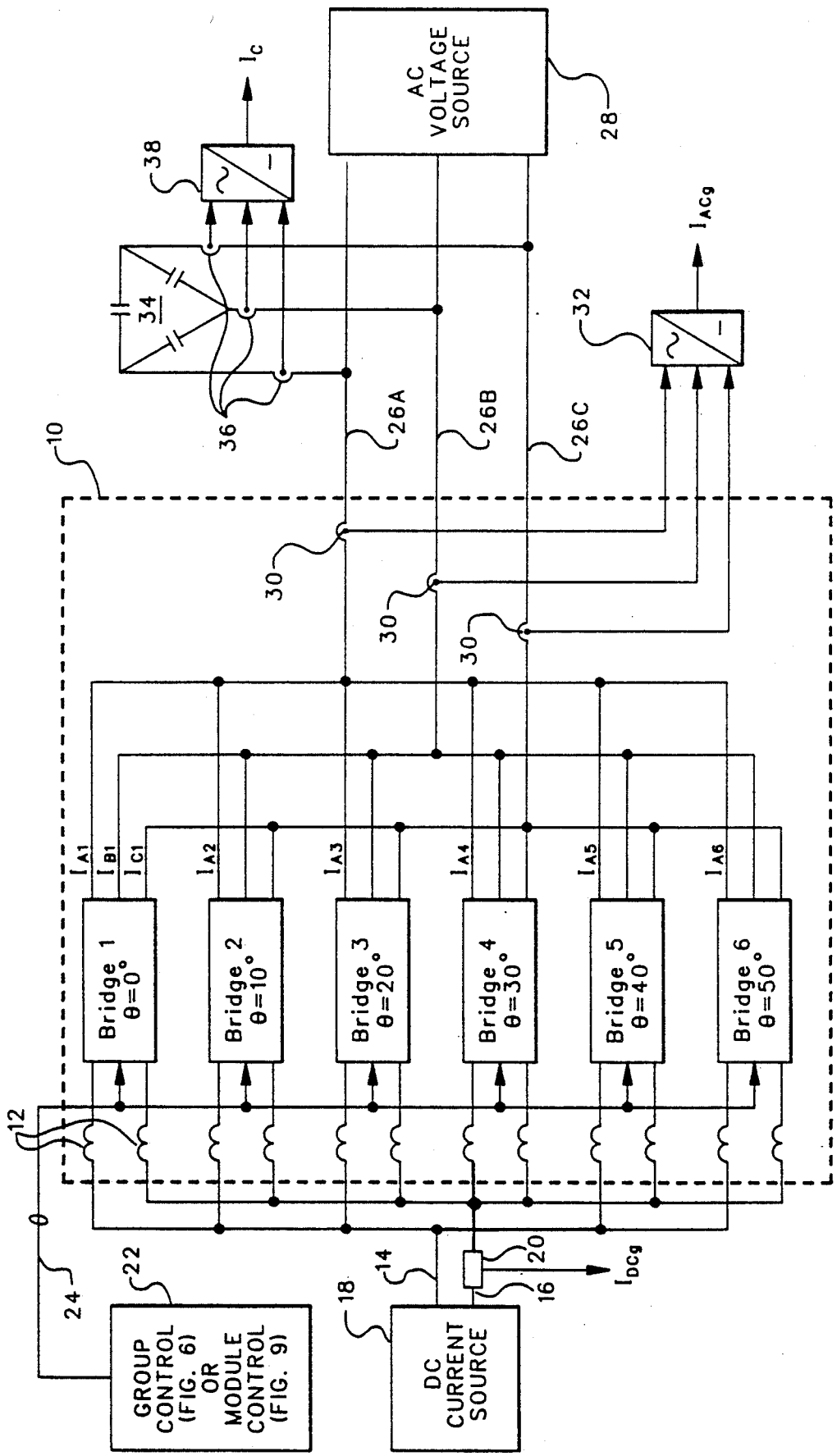
FIG. 1 is block schematic diagram illustrating the basic power conversion scheme of the present invention in accordance with a preferred embodiment.

Reference is first made to FIG. 1 which illustrates the basic power conversion scheme of the present invention. Shown within the dash line block 10 is a plurality of converter circuits in the form of full-wave bridges, bridge 1–bridge 6, which bridges collectively form a group in accordance with the nomenclature employed in the present description. Each of the bridges is similarly configured and will be described in detail with respect to FIG. 2. Suffice it to say at the present time that each of the bridges also carries a respective designation concerning a theta ($\theta$) angle, which is shown to be of differing values as will be further explained.

Figure 9:
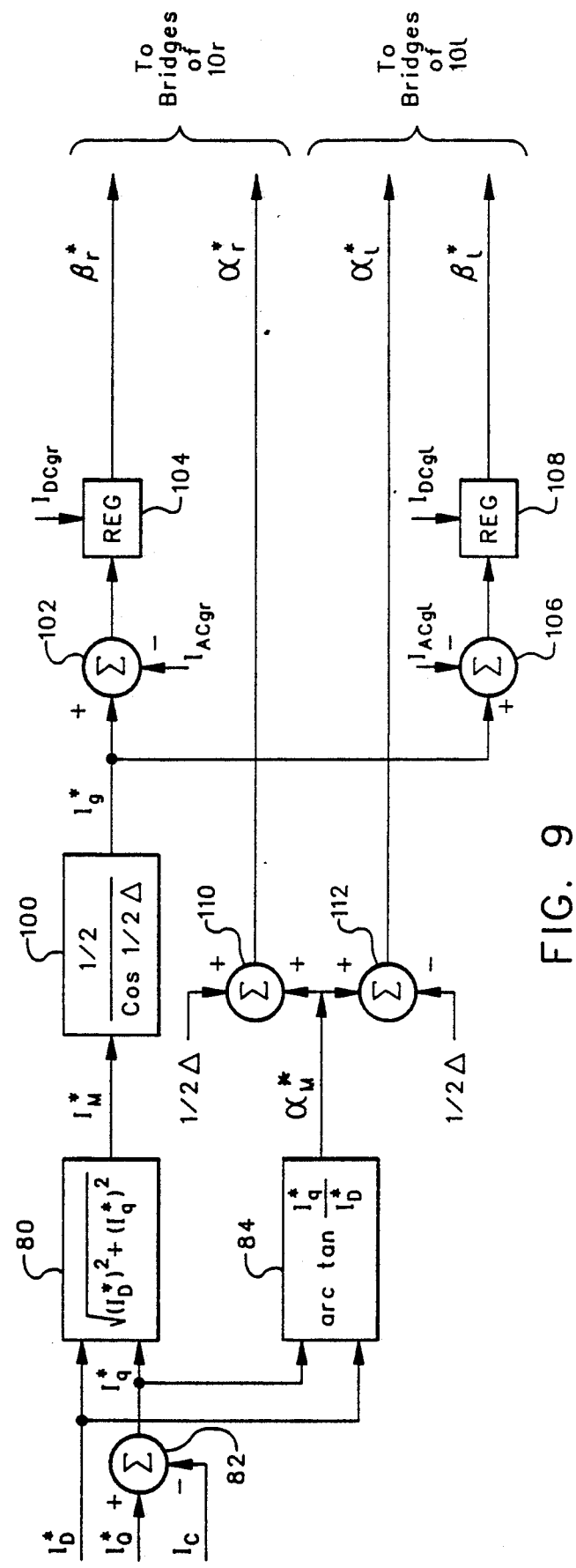
FIG. 9 is a schematic diagram illustrating the development of certain control signals applicable to the control of the individual bridges of groups of bridges (a module) connected in parallel as illustrated in FIG. 7.

Using bridge 1 as illustrative, each bridge is connected by way of a pair of inductances shown at 12 to a DC bus, lines 14 and 16, to a common DC current source 18. A suitable sensing means such as a shunt 20 is provided in one of the DC lines, for example line 16, to provide an output signal ($I_{DCg}$) which is indicative of the value of the DC current of the group, that is, the total of the bridges within the block 10. Each of the bridges receives certain input control signals. These control signals are generally indicated in FIG. 1 and shown as being supplied by way of a bus 24 emanating from a control 22. Control 22 may be either a group control such as shown as FIG. 6 or a module control such as shown in FIG. 9.

The other side of each of the bridges, the AC side, is polyphase having AC currents on three lines designated $I_{Ab}$, $I_{Bb}$, and $I_{Cb}$, respectively corresponding to the A, B, C phases of the bridge. The bridges are connected in parallel via an Ac bus, lines 26A, 26B and 26C, to an AC voltage source 28. Through suitable means such as current transformers 30, the currents in the AC bus are sensed with the transformer outputs being supplied to a rectifier 32, the output of which is designated $I_{ACg}$ representative of the group AC current. Also connected to the AC bus is a capacitor bank 34, as is customary in systems of this nature. By sensing means such as current transformers 36 located in each of the lines connecting the capacitor bank to the AC bus there is provided to a rectifier 38 the three signals corresponding to the capacitor bank currents. The output of rectifier 38 is signal $I_C$ representing capacitor current. Rectifiers 32 and 38 are preferably of a type tending to measure the fundamental component of three phase AC current and to reject harmonic currents.

Figure 2:
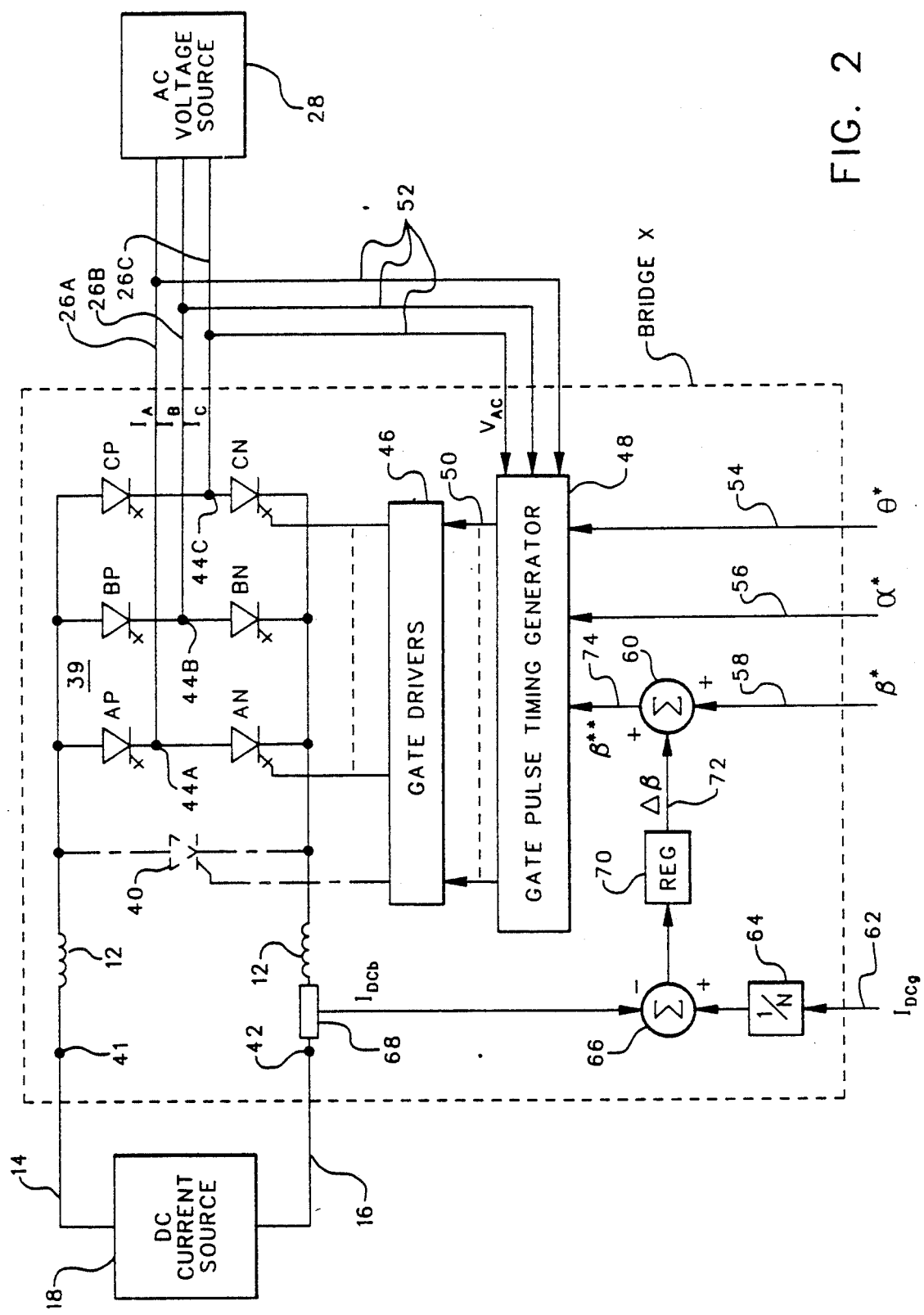
FIG. 2 is a block schematic diagram illustrating a single bridge and its control for use in the present invention.

FIG. 2 illustrates the basic configuration of the individual bridges of the group 10 (FIG. 1). Referencing now FIG. 2, within the dash line block labeled "bridge x" is the circuitry which constitutes any of the several bridges of group 10. For points of reference, also included are the DC current source 18, the DC lines 14 and 16, the AC voltage source 28, and the AC bus (lines 26A, 26B and 26C). Shown generally at 39 are six switch devices arranged in the typical three phase bridge configuration. The six devices are respectively designated AP, BP and CP and AN, BN, and CN. The letters A, B and C refer to the three phases while the P and N designations denote positive and negative sides of the configuration. As illustrated, each of the six switch devices is a gate turn-off thyristor (GTO) which terminology will be generally used for convenience in this specification. It is, however, to be expressly understood that other forms of devices such as power transistors, can be used with equal facility. The configuration 39 has a pair of DC terminals 41 and 42 which are connected to the DC lines 14 and 16 and hence to the DC current source 18. Configuration 39 also includes AC terminals 44A, 44B and 44C, respectively, at the junction of each pair of switch devices. These terminals are connected to the AC voltage source by way of the AC lines 26A, 26B, and 26C.

A thyristor 40, shown in phantom, is connected across the DC bus for purposes of shorting the DC current source. (Although a "standard" thyristor is shown, it is apparent that a gate turn-off thyristor could be used as well.) It is the function of the thyristor 40, when present, to short circuit the DC current source and thus interrupt the current on the AC bus. That is, as shown in FIG. 2, to selectively interrupt the currents $I_A$, $I_B$ and $I_C$. This is referred to as notching. As will be understood, the width of the notch (the length of conduction time of the thyristor 40) will vary the effective current as seen on the AC bus. The reason for illustrating the thyristor 40 in phantom is that this is one way of providing the notching effect and was the scheme described in the earlier mentioned co-pending application. However, it is to be expressly understood that the same notching effect can be achieved in other ways such as by simultaneously rendering conductive a diametic opposite pair of turn-on turn-off devices for example, the GTOs AP and AN. Thus, insofar as the present invention is concerned, it is the notching itself which is of importance and not the particular means for achieving the notching.

Thyristor 40, when present, and each of the GTOs of the configuration 39 receive suitable gating signals from gate drivers 46. In the case of thyristor 40, only a turn-on signal is provided. In the case of the several GTOs, both turn-on and turn-off signals are provided. (In FIG. 2, for sake of simplicity only two of the six GTOs gate connections have been illustrated.).

Gate drivers 46 receive signals via lines 50 from a gate pulse timing generator 48. This generator receives a plurality of input signals including a signal representing the voltage of the AC voltage source (VAC) via lines 52. Two command signals $\theta^*$ and $\alpha^*$ are applied directly to the generator 48 by lines 54 and 56 respectively. The sources of these two command signals will be explained. (In the present specification the use of an * in association with a signal designation indicates that that signal designation is a command signal.) A third external command signal $\beta^*$ is applied, by way of line 58, to one input of a two input summing junction 60, the other input of which is via line 72. The $\beta$ angle, as will be fully explained, represents the width of the interruptions in the AC current. Varying the duration of the interruptions will, of course, vary the effective magnitude of that AC current.

The $I_{DCg}$ signal (FIG. 1) is applied via line 62 to a divide network 64 which divides the total group current signal by a number equal to the number of bridges included in the group, six in the present example. The output of this divide network is supplied as one input to a summing junction 66, the other input being a signal $I_{DCb}$ which is derived from a suitable means such as a shunt 68 located in the DC bus. The signal $I_{DCb}$ is a signal representing the DC current of the individual bridge. Summing junction 66 provides the difference between its two input signals, the difference between the DC current of the individual configuration 39 and what amounts to the average of the DC currents of the group bridges, to provide an output to a regulator 70. Regulator may be a proportional plus integral regulator which provides on its output 72 a signal Δβ which serves as a second input to the summing junction 60. The signal Δβ represents the incremental change in the β angle to bring the associated bridge current to the average of the group. The output of that junction 60 (line 74) serves as the last remaining input to the gate pulse timing generator. This signal is a designated β**, specifying the command β angle for this bridge. The three signals on lines on 54, 56 and 74 thus represent the timing of the various gate signals as applied to the gate drivers 46 and are synchronized with respect to the $V_{AC}$ signal all in a manner now to be explained.

Figure 3:
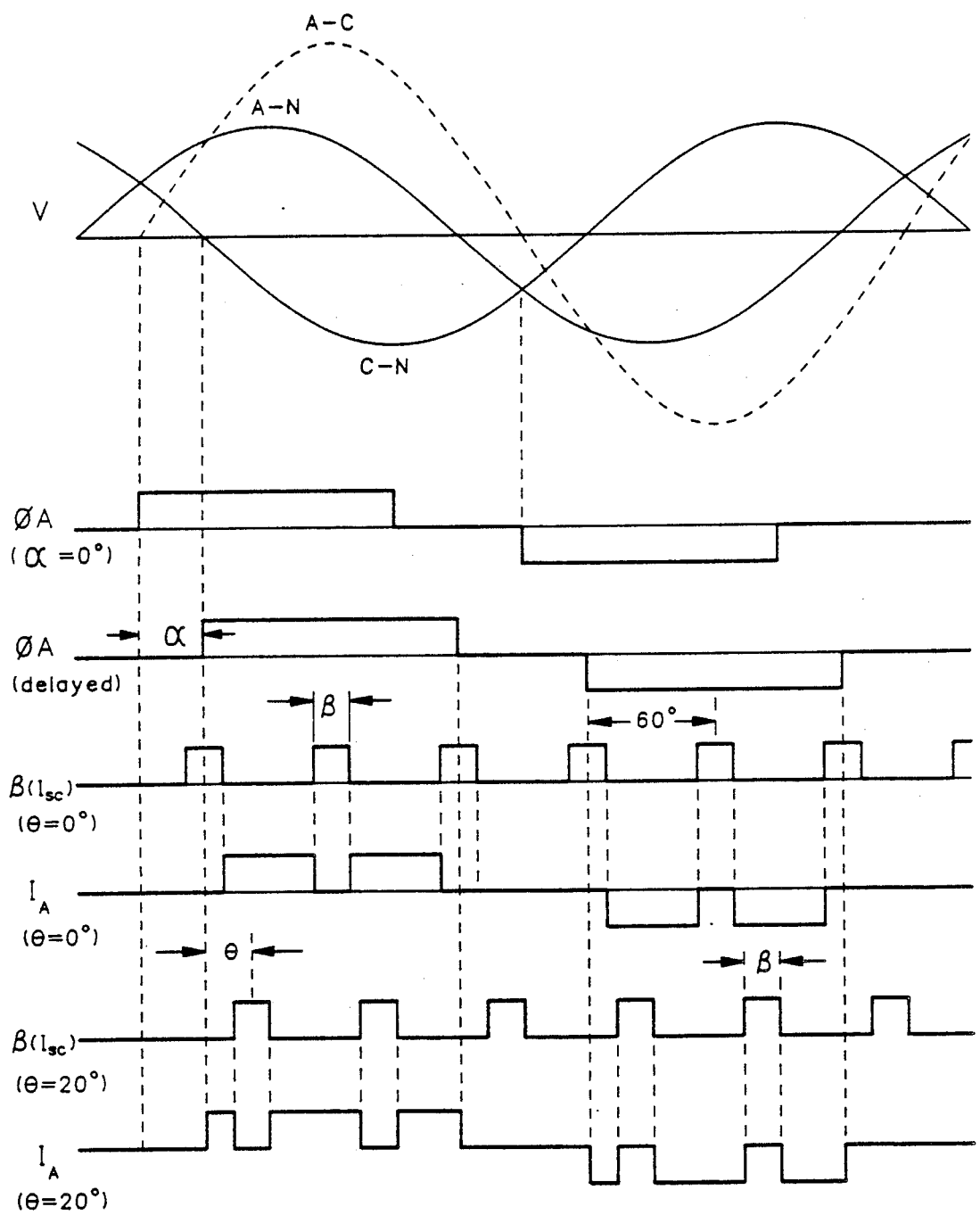
FIGS. 3, 4, and 5 are each a series of waveforms useful in understanding the present invention.

In FIG. 3, the top trace shows the phase A and phase C line-to-neutral voltages (A-N and C-N) and the A-C line-to-line voltage. These representations establish a time reference. The second trace, φA (α=0°), shows the phase A current of a conventional three-phase GTO bridge, without a shorting period or notching, gated for unity power factor current. As such, the φA waveform is centered on the A-N voltage waveform, is "on" for 120 electrical degrees, and starts at the zero crossing of the A-C line-to-line voltage waveform. This position of gating the GTOs is defined as the zero value of the α angle (α=0°).

The third trace of FIG. 3, φA (delayed), shows a current waveshape generated by delaying the gating of the bridge GTOs by an angle α which, in FIG. 3, is shown as approximately 30 degrees. Thus, in accordance with the present description the angle α is defined as the angle between the zero crossing of a line-to-line voltage and the beginning of a conduction period for a corresponding bridge phase current and is a function of the α* command signal (FIG. 2). In the present example this last mentioned current would be initiated by gating on GTO AP (FIG. 2).

Since the trace φA (α=0°) represents unity power factor (fundamental) operation, the angle α can also be defined as the power factor angle for displacement power factor. That is:

$$Power\ factor = \cos \alpha \quad (1)$$

Relating the angle α to associated real and imaginary current components ($I_D$ and $I_Q$ respectively), as will be later employed, yields:

$$I_Q/I_D = \tan \alpha \quad (2)$$

The angle beta (β) defines the width of the shorting periods (or the notches) in the phase currents which, in the present illustration, (trace four of FIG. 3) individually have a duration of about 15 electrical degrees and occur six times per cycle, spaced 60 electrical degrees. The fourth trace in FIG. 3 also carries a designation "($I_{SC}$)". The terminology "$I_{SC}$" is a symbol for short circuit current, and indicates not only that the AC current is notched, but also that the DC current is shorted during β pulses whether by conduction of thyristor 40, if present, or by some other notching technique such as rendering a pair of diametrically opposite GTOs conducting. This fourth trace also is related to an additional angle theta (θ), as will be explained, and represents an angle of zero degrees for θ. The fifth trace, labeled $I_A$, illustrates the effect of the shorting pulses on the phase A current (on line 26A of FIG. 2) with the conditions a β of approximately 15 degrees and a θ of zero degrees.

The sixth trace in FIG. 3 is labeled β($I_{SC}$) (θ=20). This shows a β angle or pulse of the same duration as earlier illustrated but phase displaced with respect thereto by an angle of approximately 20 degrees. This displacement is represented by the angle θ. That is, θ is the displacement of the β pulse. The last trace in FIG. 3 illustrates the phase A current as it would appear with an α of approximately 30 degrees, a θ of approximately 20 degrees, and a β pulse of approximately 15 degrees.

The β pulses (the short circuit periods) and the α angles and their effects upon the individual bridge currents are described in greater detail in the incorporated co-pending patent application and reference is specifically made thereto for such greater detail. The use of the θ angle will be explained further hereinafter; suffice it to say at the present time that the θ angle, with respect to an individual bridge, is a function of the signal θ* applied to the gate pulse timing generator 48 (see FIG. 2).

Figure 4:
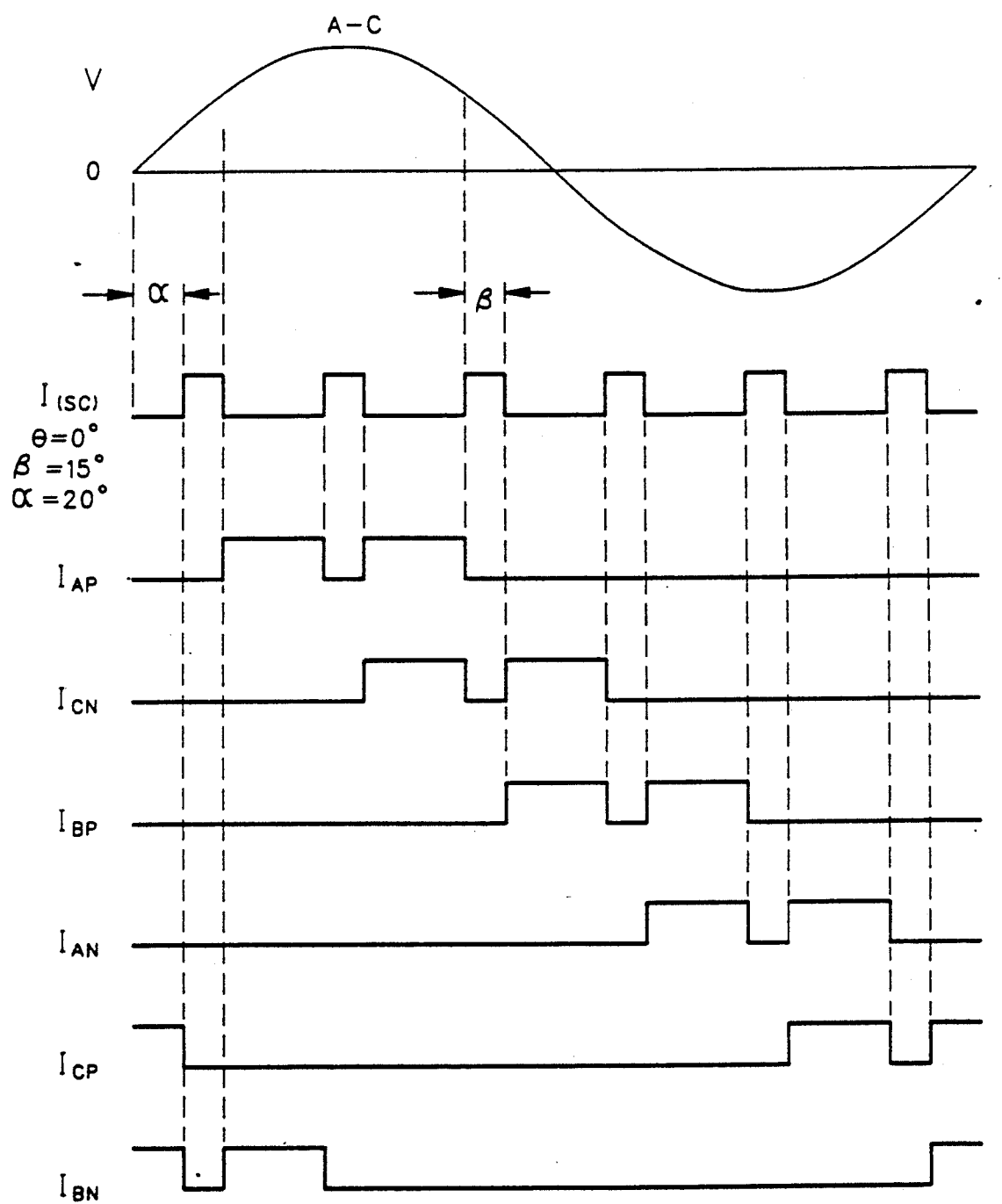

The waveforms of FIG. 4 demonstrate the currents of the several GTOs of FIG. 2 over a 360 degree period with a β of 15 degrees, an α of 20 degrees and a θ of 0 degrees. Similar analyses could be made for other angles but, in view of the foregoing, it is believed that such is unnecessary.

Figure 5:
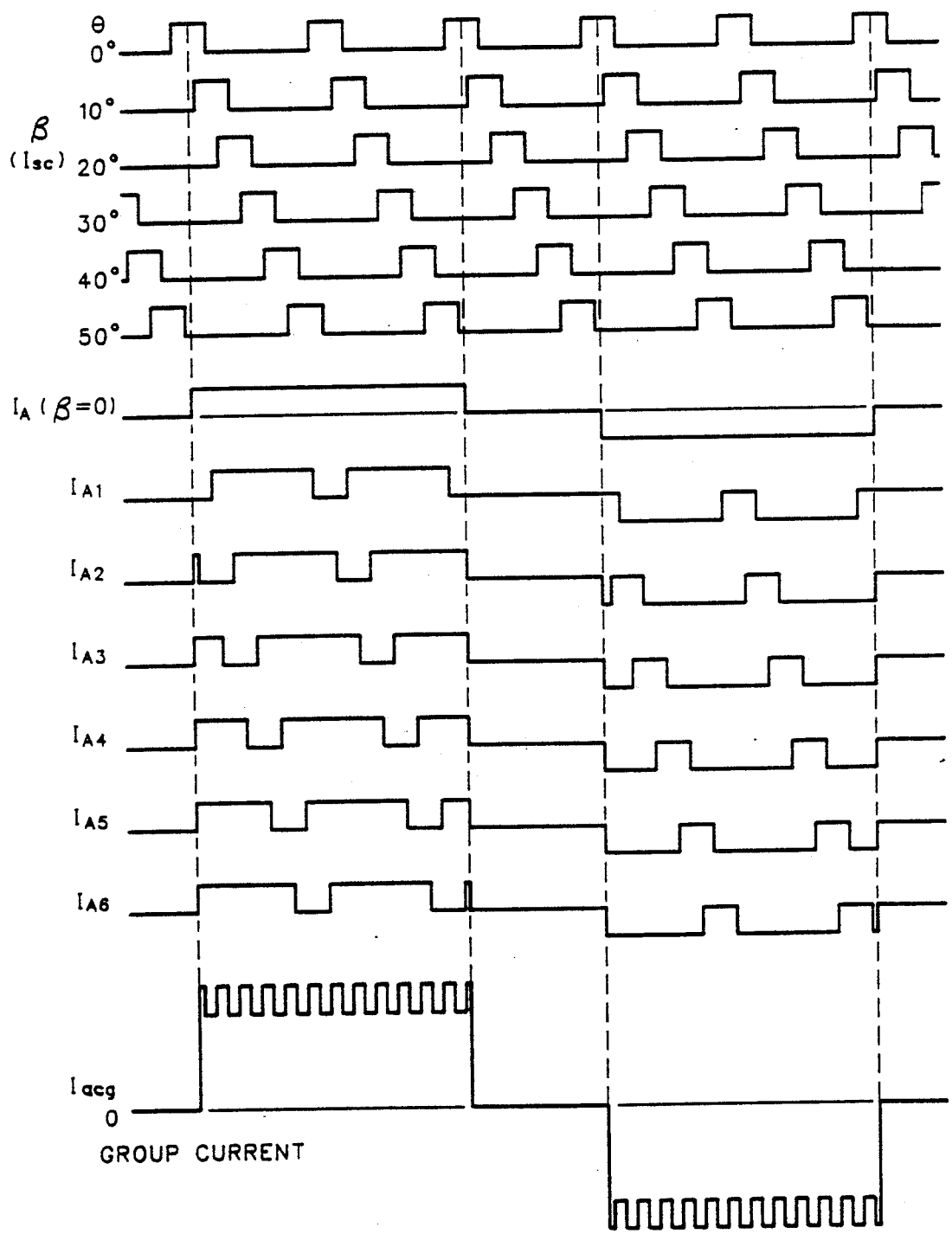

When a plurality of bridges, as individually depicted in FIG. 2, are parallel connected as shown in FIG. 1, having θ angles equally distributed in the manner indicated; i.e., six bridges distributed over 60 electrical degrees, the combined current waveform as seen on the AC lines 26A, 26B and 26C has a composite appearance. The wave shapes of FIG. 5 illustrate the resulting group current of the gating sequence indicated. The top six traces of FIG. 5 illustrate β pulses ($I_{SC}$) of approximately 15 degrees duration with the several values of θ for the various bridges. The next trace labeled $I_A$(β=0°) is a reference which illustrates a unity power factor phase current from a bridge without a shorting or β pulse. The next six traces label $I_{A1}$ through $I_{A6}$ illustrate the effects on the A phase AC currents of each of the six bridges of the group 10 as they are acted upon by the respective shorting or β pulses. The last trace in FIG. 5 represents the sum of the preceding six traces and shows the $I_{acg}$ current as would appear on bus 26A for the group 10 (FIG. 1).

It is noted that this group current $I_{acg}$ can be viewed as a single inverter bridge current which has an adjustable current ratio with respect to its input current. This ratio is a function of the β angle which was selected. This wave shape exhibits essentially no harmonics other than the characteristic harmonics of a 120 degree square wave output. (This, of course, ignores the ripple on the top $I_{acg}$ current.) It is further noted that the output current will be somewhat less than six times the maximum value of the individual bridge currents. This is, as would be expected, by virtue of the notching effect. In the present example, having a β pulse of approximately 15 degrees, the effective value of the output current of $I_{acg}$ is approximately four and one-half times the maximum value of the individual phase currents.

It has been stated that the β angles of all of the bridges or elements of a group are equal. This is essentially true; however, slight adjustments to the β angles are made by the individual controls to their respective bridges in order to control current sharing therebetween. This adjustment is the function of the Δβ signal as was described with respect to FIG. 2. There, it will be remembered, the Δβ signal modified the β* signal to yield β** which was applied to the gate pulse timing generator, the Δβ signal being a function of the difference between the DC current of an individual bridge and the average of the group of bridges.

As was taught in the incorporated co-pending application, the basic $\beta$ angle is a function of the commanded current and is, for a three phase bridge, defined as follows:

$$\beta = 60° \left( \frac{I_{fm} - I_f^*}{I_{fm}} \right); \text{ wherein} \tag{3}$$

$$I_{fm} = I_{DC} (0.78) \text{ and} \tag{4}$$

$$I_f^* = \text{commanded value of fundamental component of AC source current; i.e.} \tag{5}$$

$$= \sqrt{(I_D^*)^2 + (I_Q^*)^2}$$

Figure 6:
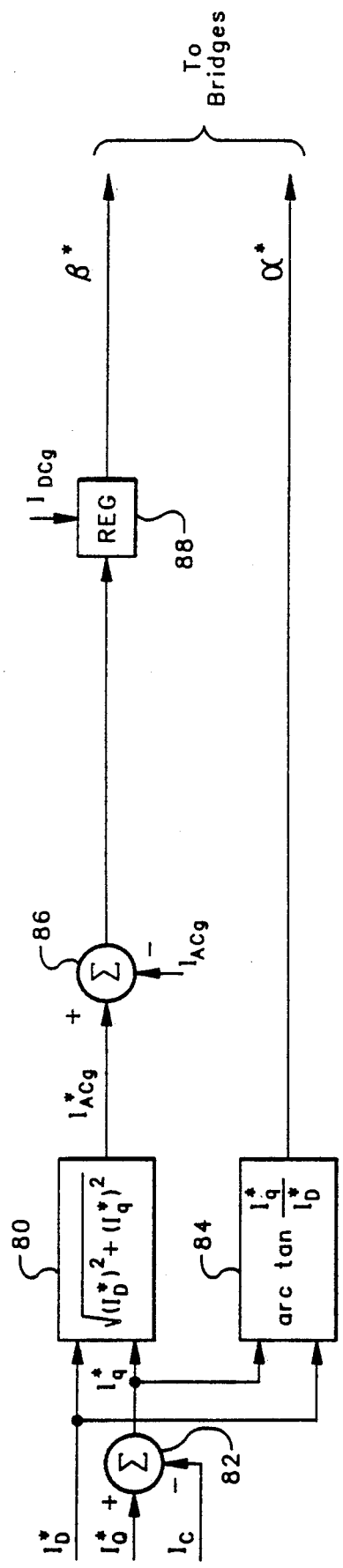
FIG. 6 is a schematic diagram illustrating the development of certain control signals applicable to the control of the individual bridges of a group of parallel connected bridges in accordance with the present invention.

As such, since each bridge control has its own current regulator which sets the value of $\beta$, as will become apparent with the descriptions of FIGS. 6 and 9, it will be sufficient to define to the control the desired value of $I_f^*$ and $\alpha 8$ or, in the alternative, to specify the required real and reactive components of the desired currents; i.e., $I_D^*$ and $I_Q^*$. Since all of the bridges have the same current command input, each bridge will, therefore, fine tune itself to effect current sharing. It is also noted that since these elements are all connected to the DC source in parallel, they must reflect to that source a counter electromotive force (emf) which is identical. The fine tuning of the $\beta$ pulse (the duration $I_{SC}$) will inherently meet this requirement.

If all angles of $\beta$ are acceptable, one problem that immediately appears is that demonstrated by the small pulse which appears at the beginning of that trace of FIG. 5 identified as $I_{A2}$. This problem can be addressed in two ways. The first of these is to limit the acceptable $\beta$ angles to those which do not produce such pulses. A more satisfactory solution is to anticipate, through the control logic of the gate pulse timing generator, whether any particular set of operating parameters will demand a pulse less than the minimum the GTOs of the bridge can execute (typically about 4 electrical degrees) and simply inhibit any gate pulse to the respective GTO which would attempt such a result. This latter method will tend to disrupt the balancing of the currents among the bridges of a group but since the effect of eliminating such a narrow current pulse is small, adjustment can be readily accommodated by appropriate adjustments of the widths of the rest of the $\beta$ pulses for that bridge.

FIG. 6 illustrates a method of generating the control signals $\beta^*$ and $\alpha^*$ which are supplied as control signals to bridge x of FIG. 2. The $\theta^*$ signal is normally fixed for each bridge at the time of design and not used as a control variable. In the embodiment shown in FIG. 1, in which there were six bridges, the $\theta$ angles to the several bridges were 10 degrees apart; that is, 60 divided by the number of bridges constituting a group. The $I_D^*$ and the $I_Q^*$ signals representing respectively the desired real and reactive components of the current of the group would be provided by some operator input such as a operator control, or the overall system control, which has not been shown. The $I_D^*$ signal serves as one input to function block 80 which block has the function indicated of the square root of the sum of the squares. The other input to block 80 is an Iq* signal which is the ouput of a summing junction junction 82. The two inputs of the gate are $I_Q^*$ signal and the $I_C$ signal which represents the actual capacitor current (reference FIG. 1). Since the capacitor current is reactive, it must be subtracted from the command signal $I_Q$ in order to derive the total amount of reactive current that is required of the bridge. (It should be noted that the $I_C$ signal could derived other than as is herein illustrated. For example, it is known that: $I_C = V_{AC} \omega C$, and thus $I_C$ could be calculated for a known capacitor bank 34, (FIG. 1) and frequency using the voltage signal $V_{AC}$.) The output of function block 80 is a signal designated $I_{ACg}^*$ which is applied as one input to a summing junction 86 the second input of which is the sign $I_{AC}$ representing the actual AC current of the group (block 32 in FIG. 1). The difference of these signals, an error signal representing the difference between the commanded and actual currents, is applied to a suitable regulator 88 (for example, a proportional plus integral regulator) having as a second input the $I_{DCg}$ signal, derived in FIG. 1 from the sensor 20. The regulator includes the functions defined by expressions (3) and (4) to obtain a $\beta$ command from a fundamental current command. The regulator output is the $\beta^*$ signal which is applied to each of the bridges within the group 10.

The $I_D^*$ and $I_q^*$ signals are also applied to a second function block 84 which has a function: arc tan $I_q^*/I_D^*$. This, as was earlier indicated by equation 2 above, is the $\alpha^*$ signal which is also applied to the individual bridges of the group.

Figure 7:
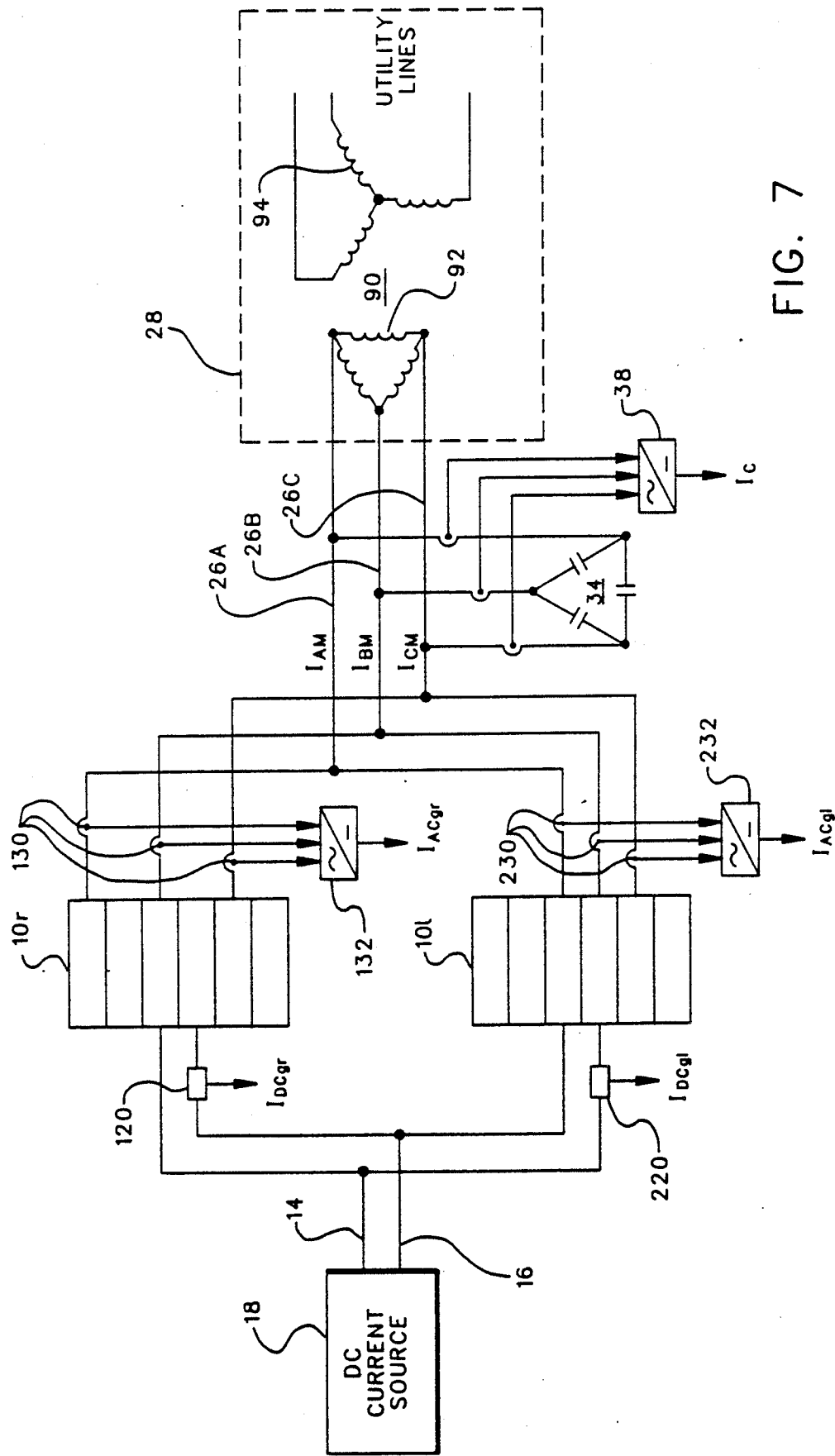
FIG. 7 illustrates the paralleling of two groups of bridges, as shown in FIG. 1, to provide a module in accordance with the present invention in a preferred embodiment; and, FIG. 8 is a series of waveforms illustrating the operation of the circuitry depicted in FIG. 7.

FIG. 7 illustrates a preferred embodiment of the present invention. In FIG. 7 two groups of bridges, labeled respectively 10r and 10l, together form a module and are individually connected to the DC current source 18 by the DC bus. The output currents of the two groups are connected in parallel to AC bus (lines 26A, 26B, 26C) and hence to the AC voltage source 28 which is shown to include a means for summing currents in the form a transformer 90 having a delta connected primary winding 92 and a wye connected secondary winding 94. The secondary winding is connected to the utility lines. Each of the groups 10r and 10l is substantially identical in physical configuration conforming to the group showing of FIG. 1. The "r" and "l" designations denote, as will further be explained, a retarded and leading relationship between the two groups.

Sensing means 120 and 220 are provided in the respective portions of the DC bus, to derive output signals proportional to the DC currents of the groups 10r and 10l. These signals are, respectively, $I_{DCgr}$ and $I_{DCgl}$.

Similarly, signals representing the AC currents, $I_{ACgr}$ and $I_{ACgl}$, are developed for the two groups. Signals from current transformers 130 provide inputs to a rectifier 132 to develop the $I_{ACgr}$ signal. Current transformers 230 provide signals to a rectifier 232 to develop $I_{ACgl}$ signal. The two group currents are combined on the AC bus to yield the module phase currents $I_{AM}$, $I_{BM}$ and $I_{CM}$. The capacitor bank 34 and the derivation of a signal representing its current is as was earlier explained.

While the two groups are physically the same, they differ in the way they are operated. In this example, group 10r is gated as described with respect to FIG. 5, at some $\alpha$ angle to be determined, but retarded by angle $\frac{1}{2}$ delta ($\frac{1}{2}\Delta$) from the value of $\alpha$. By contrast, the elements of the group 10l, are gated at an angle $\frac{1}{2}$ delta in advance (leading) of the nominal value of $\alpha$. Each of the groups has, preferably, the same $\beta$ angle distribution (same set of $\theta$ angles) but because the counter emfs reflected by the two groups to the DC current source will probably differ, the duration of the $\beta$ pulses may differ by a considerable amount between the two groups.

Figure 8:
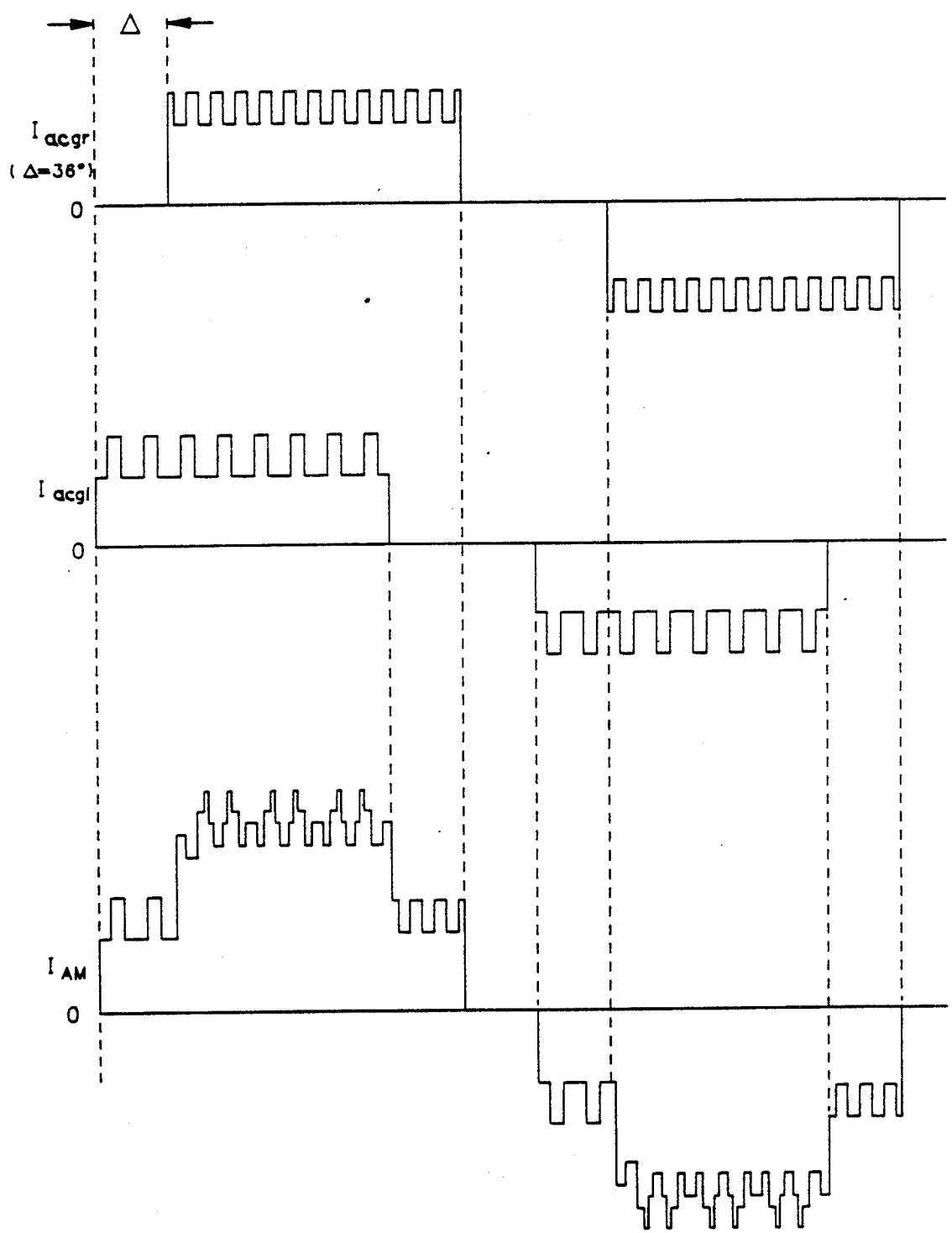

The traces of FIG. 8 illustrate a typical output (one phase) of the FIG. 7 configuration as seen on the AC lines 26A, 26B, 26C. The upper trace of FIG. 8 is substantially identical to the last trace of FIG. 5. The second trace of FIG. 8 is shown to lead the first by an angle $\Delta$ the significance of which will be explained. The ripple on the top of the two waves differs since the two groups will have different $\beta$ pulse durations.

The two currents $I_{acgr}$ a $I_{acgl}$ are combined to form a module output current ($I_{AM}$) as illustrated in the third trace of FIG. 8. This $I_{AM}$ current can, by virtue of the $\Delta$ displacement between the two components, be made substantially free of a desired harmonic of the fundamental frequency. This is in keeping with the generally known principle that phase displaced combined identical waveshapes effect harmonic reduction following the relationship:

$$\Delta = \text{Displacement} = \left( \frac{180°}{\text{Harmonic to be reduced}} \right)$$

Thus, if the two wave shapes of the present example are displaced by a $\Delta$ of 36 electrical degrees $$\left( \frac{180}{5} \right)$$

the fifth harmonic will be, theoretically, eliminated (as will odd multiples thereof). This elimination is compromised slightly because of the different ripples on the two group current waveforms. Since the typical three phase bridge operation (as is herein illustrated) has a 120 degree conductive period and hence a 60 degree displacement, the waveshape will also be free of third harmonics, and odd multiples of the third. Accordingly, the AC current of the module, phase currents $I_{AM}$, $I_{BM}$ and $I_{CM}$ will be substantially free of all odd multiples of the third and fifth harmonics of the fundamental frequency.

With this knowledge, the transformer 90 and the capacitor bank 34 can be selected to be resonant at or near the fifth harmonic and the circuit controlled to avoid exciting this resonance.

FIG. 9 illustrates one possible control circuitry for the module embodiment as represented by FIGS. 7 and 8. The similarity between FIGS. 6 and 9 is readily apparent. Once again the $I_D^*$ and $I_Q^*$ signals are applied from an external source. The $I_D^*$ is applied directly to the function block 80 which, as earlier, provides a square root of the sum of the squares function. The $I_Q^*$ is applied again to one input of a summing junction 82 the other input of which is the $I_C$ signal The output of junction 82 is the $I_q^*$ signal which is applied to function block 80. In this case the output of function block 80 is a signal designated $I_M^*$ which is the commanded module current. This signal is applied to a block 100 which has the function $$\left( \frac{1}{\cos\frac{1}{2}\Delta} \right).$$

The output of this function, a signal of designated $I_g^*$, is the current which is commanded out of each of the groups 10r and 10l. This signal is applied to a first summing junction 102, the second input to which is the actual current signal $I_{ACgr}$ from the retarded group 10r. The output of is furnished to a regulator 104, similar to regulator 88, in FIG. 6. The other input to regulator 104 is the signal $I_{DCgr}$ representing the actual DC current of the retarded group. The output of the regulator 104 is a signal designated $\beta_r^*$ as which is the $\beta$ command for group 10r.

$I_g^*$ signal out of block 100 is also applied to a second summing junction 106 the second input of which is the $I_{ACgl}$ signal representing the AC current of the leading module 10l. Junction 106 provides an input to another regulator 108, similar to regulator 104, the other input of which is $I_{DCgl}$ signal. The output of regulator 108 is the $\beta_l^*$ signal to control the leading group 10l.

The $I_D^*$ and $I_q^*$ signals again serve as inputs to a function block 84 whose output is a signal designated $\alpha k_M^*$, the commanded $\alpha$ angle of the module. This signal is applied simultaneously to a pair of summing junctions 110 and 112. The other input to each of these junctions is a signal representing one-half of the desired $\Delta$ angle, derived from some exterior input, not shown. In case of junction 110 the $\frac{1}{2}\Delta$ signal is added to the $\alpha_M^*$ signal to yield, as its output, a signal designated $\alpha_r^*$, the $\alpha$ angle for group 10r. In a similar manner, the $\frac{1}{2}\Delta$ signal is subtracted from the $\alpha_M^*$ signal in junction 112 to provide an output $\alpha_l^*$ signal for the group 10l. As indicated, the signals are supplied to the individual bridges (FIG. 2) of the respective groups along with a suitable $\theta$ angle as earlier described for the overall control of the module.

Thus it is seen that there has been provided an improved power conversion scheme for the transfer of power between the DC current source and a AC voltage source. While the present invention has been described in its preferred embodiments, modifications thereto will readily occur to those skilled in the art. For example, although each of the groups has been shown as having six elements, a greater or lesser number could be used. For example, 3, 4 or 12 element groups appear to be logical choices. In these examples the evenly distributed $\beta$ pulses would be based, respectively, at 20, 15 and 5 degree increments.

While full-wave bridges have been illustrated and described, as earlier indicated half-wave star converters including a shorting switch would be equally acceptable for use in the present invention.

Further, it is specifically noted that closed loop regulators may be configured encompassing the converters and controls shown. For example, closed loop regulators might include sensors for $I_D$ and $I_Q$ for the AC voltage source, means to compare sensed $I_D$ and $I_Q$ to commanded values of thereof, and regulator means to modify $I_D^*$ and $I_Q^*$ to provide precision response to commanded values.

In addition, two or more modules as illustrated in FIG. 7 could be connected in parallel, phase ($\Delta$) displaced with respect to each other by some increment or further harmonic reduction. For example, a displacement of approximately 25.7 electrical degrees between modules would substantially eliminate the seventh harmonic and its odd multiples. It is not desired, therefore, that the present invention be limited to the specific embodiments shown and described and it is intended, in the appended claims, to cover all such modifications as fall within the true spirit and scope of the invention.

What is claimed is:

1. A method of controlling a power conversion apparatus comprised of a plurality of polyphase converter circuits connected in parallel between a DC current source and a AC voltage source comprising the steps:
   a) selectively activating said converter circuits to provide polyphase currents at a fundamental frequency corresponding to that of said AC voltage source;
   b) selectively interrupting said polyphase currents on an individual basis, said interruption being of generally uniform duration and being substantially evenly distributed in time among the individual circuits of said plurality whereby the magnitude of said currents is adjusted without significant variation in the harmonic content of the total of the currents of said plurality.

2. The method in accordance with claim 1 further including the step of adjusting the duration of said interruptions as a function of a desired output current value.

3. The method in accordance with claim 1 further including the step of adjusting the duration of said interruptions to improve current balance among the converter circuits of said plurality.

4. The method in accordance with claim 2 further including the step of adjusting the duration of said interruptions to thereby improve current balance among the converter circuits of said plurality.

5. The invention in accordance with claim 1 wherein said converter circuits are comprised of full-wave bridge circuits.

6. The invention in accordance with claim 5 wherein each of said bridge circuits is comprised of switch devices capable of being rendered conducting and non-conducting in response to applied gating signals and wherein the step of effecting an interruption is accomplished by selectively rendering conductive and non-conductive a diametrically opposite pair of said switch devices.

7. The invention in accordance with claim 1 wherein each of said converter circuits is comprised of switch devices capable of being rendered conducting and non-conducting in response to applied gating signals, wherein there is further included an additional switch device connected in mutual parallel with said DC current source, and an associated one of the converter circuits, and wherein the step of effecting an interruption is accomplished by selectively rendering said additional switch conducting and non-conducting.

8. The invention in accordance with claim 6 wherein said switch devices are gate turn-off thyristors.

9. The invention in accordance with claim 7 wherein said switch devices are gate turn-off thyristors.

10. The invention in accordance with claim 7 wherein the converter circuit switch devices are gate turn-off thyristors and said additional switch devices is a thyristor.

11. A power conversion scheme for a transferring electrical power between a DC current source and a polyphase AC voltage source comprising:
   a) a plurality of parallel connected polyphase converter circuits having AC and DC terminals, each of said converter circuits comprised of a plurality of switch devices adapted to being selectively rendered conducting and non-conducting in response to applied gating signals to provide AC phase currents;
   b) an AC bus connected to said AC voltage source and to said AC terminals whereby said phase currents are transmitted between said AC source and said converter circuits;
   c) a DC connecting said DC source and said converter circuits whereby a DC current is established therebetween;
   d) inductive means located in said DC bus associated with each of said converter circuits thereby individually isolating each of said converter circuits with respect to DC current source;
   e) means responsive to applied gating signals to effect interruption periods within said phase currents; and,
   f) control means for selectively furnishing said gating signals, said control means responsive to a signal defining a distribution pattern among the plurality of converter circuits and responsive to power conversion scheme operating parameters to develop and respond to additional signals representing interruption period durations and a beginning of conduction period for the switch devices of the respective converter circuit whereby said interruption periods are generally evenly distributed in time among the converter circuits of said plurality and are varied in duration to thereby effect substantially equal sharing of current among the said converter circuits and to reflect equal counter electromotive forces to said DC current source.

12. The invention in accordance with claim 11 wherein said converter circuits are comprised of full-wave bridge circuits.

13. The invention in accordance with claim 11 wherein said switch devices are gate turn-off thyristors.

14. The invention in accordance with claim 12 wherein said means responsive to gating signals comprises a series connected pair of switching devices of an associated one of said polyphase converter circuits connected across said DC bus.

15. The invention in accordance with claim 11 wherein said means responsive to gating signals comprises a thyristor connected across said DC bus.

16. A method of controlling a power conversion apparatus comprised of first and second parallel connected groups of converter circuits connected in parallel between a DC current source and an AC voltage source comprising the steps:
   a) selectively activating the converter circuits of said first group to provide polyphase AC currents at a fundamental frequency corresponding to that of said AC voltage source and at prescribed time phase relationship thereto;
   b) selectively activating the converter circuits of said second group to provide polyphase currents at said fundamental frequency but at a different prescribed time phase relationship than that of said first group;
   c) effecting an interruption of said polyphase currents on an individual basis, as related to said converter circuits, said interruption being:
      1) substantially uniformly distributed among the bridge circuits of a group, and
      2) of generally uniform duration within a group.

17. The method in accordance with claim 16 further including the step of adjusting the duration of said interruptions as a function of a desired output current value.

18. The method in accordance with claim 16 further including the step of adjusting the duration of said interruptions to improve current balance among the converter circuits of a group.

19. The method in accordance with claim 17 further including the step of adjusting the duration of said interruptions of the converter currents to thereby tend to improve current balance among the converter circuits of a group.

20. The method in accordance with claim 16 wherein said different time phase relationship is determined as a function of a desired reduction in a harmonic of said fundamental frequency.

21. The invention in accordance with claim 20 wherein said function is defined by the relationship:

$$\text{Difference in time phase} = \left(\frac{180°}{\text{Harmonic to be reduced}}\right)$$

22. The method in accordance with claim 16 wherein said different time phase relationship, of activating the converter circuits of said second group, is approximately thirty-six electrical degrees.

23. The invention in accordance with claim 16 wherein said converter circuits are comprised of full-wave bridge circuits.

24. The invention in accordance with claim 23 wherein each bridge circuit of each of said groups is comprised of switch devices capable of being rendered conducting and non-conducting in response to applied gating signals and wherein the step of effecting an interruption is accomplished by selectively rendering conducting and non-conducting a diametrically opposite pair of said switch devices.

25. The invention in accordance with claim 16 wherein each converter circuit of each of said groups is comprised of switch devices capable of being rendered conducting and non-conducting in response to applied gating signals, wherein there is further included an additional switch device connected in mutual parallel with said DC current source and an associated one of the converter circuits and wherein the step of effecting an interruption is accomplished by selectively rendering said additional switch conducting and non-conducting.

26. The invention in accordance with claim 24 wherein said switch devices are gate turn-off thyristors.

27. The invention in accordance with claim 25 wherein said converter circuit switch devices are gate turn-off thyristors and said additional switch device is a thyristor.

28. A power conversion scheme for transferring electrical power between a DC current source and a polyphase AC voltage source comprising:
a) at least one module comprised of first and second groups of power conversion bridges connected in parallel between said DC current source and said AC voltage source;
1) each of said groups comprised of a plurality of similarly configured parallel connected polyphase bridge circuits having AC and DC terminals, each of said bridge circuits comprised of a plurality of switch devices adapted to be selectively rendered conducting and non-conducting in response to applied gating signals to provide AC phase currents,
b) an AC bus connecting said AC voltage source to said AC terminals whereby said phase currents are transmitted between said AC source and said bridge circuit;
c) a DC bus connecting said DC current source and said bridge circuit whereby a DC current is established therebetween;
d) inductive means, located in said DC bus, associated with each of said bridge circuits for individually isolating each of said bridge circuits with respect to said DC current source;
e) means responsive to applied gating signals to effect interruption periods within said phase currents; and
f) control means for selectively furnishing said gating signals, said control means responsive to a signal defining a distribution pattern among the plurality of converter circuits and responsive to power conversion scheme operating parameters to develop and respond to additional signals representing interruption period durations and a beginning of conduction period for the switch devices of the respective converter circuit whereby said interruption periods are generally evenly distributed in time among the bridge circuits of each of said groups and are varied in duration to thereby effect substantially equal sharing of current among the bridge circuits of a group and to reflect substantially equal counter electromotive forces to said DC current source.

29. The invention in accordance with claim 28 wherein said switch devices are gate turn-off thyristors.

30. The invention in accordance with claim 28 wherein said means responsive to gating signals comprises a series connected pair of switching devices of an associated one of said polyphase converter circuits connected across said DC bus.

31. The invention in accordance with claim 28 wherein said means responsive to gating signals comprises a thyristor connected across said DC bus.

32. The invention in accordance with claim 28 wherein said control means further provides gating signals to said bridge circuits in a manner whereby the phase currents of said first group is time phase displaced with respect to the phase currents of said second group.

* * * * *